Nov. 18, 1969   R. S. BRUMM   3,479,004
VALVE CONSTRUCTION
Filed May 11, 1967   2 Sheets-Sheet 1
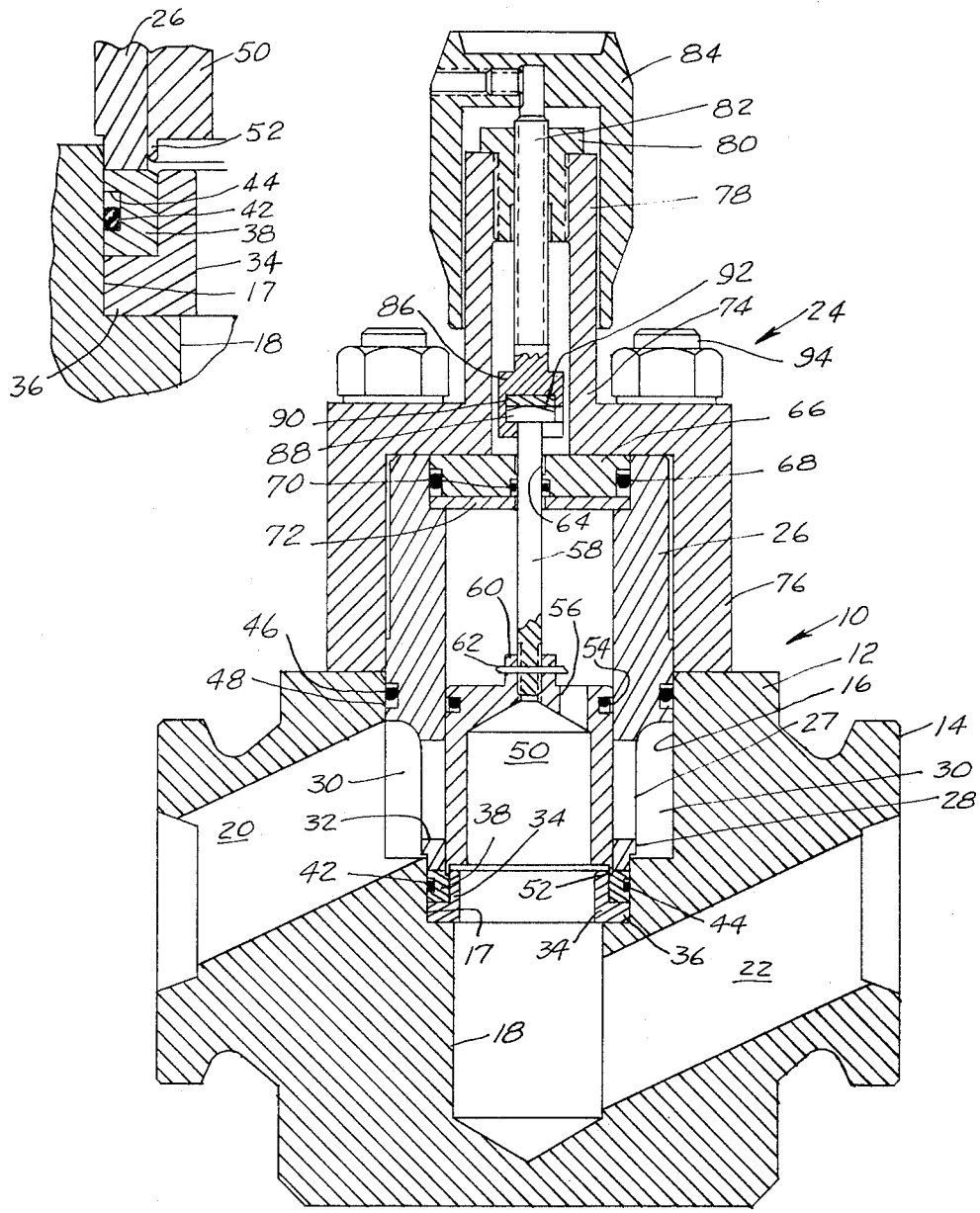
INVENTOR.
RICHARD S. BRUMM
BY
Gregg & Stidham
ATTORNEYS Nov. 18, 1969  R. S. BRUMM  3,479,004
VALVE CONSTRUCTION
Filed May 11, 1967  2 Sheets-Sheet 2

INVENTOR.
RICHARD S. BRUMM
BY
Gregg & Stidham
ATTORNEYS

United States Patent Office 3,479,004
Patented Nov. 18, 1969

3,479,004
VALVE CONSTRUCTION
Richard S. Brumm, El Cerrito, Calif., assignor to Grove Valve and Regulator Company, Oakland, Calif., a corporation of California
Continuation-in-part of application Ser. No. 426,171, Jan. 18, 1965. This application May 11, 1967, Ser. No. 637,794
Int. Cl. F16k 3/00, 31/50, 5/04
U.S. Cl. 251—118                    7 Claims

ABSTRACT OF THE DISCLOSURE

A valve construction wherein a receptacle in a housing body receives a self-contained valve sub-assembly. The cover portion of the sub-assembly is of a selected height so that the sub-assembly penetrates the housing an amount necessary to control a flow passage at a particular depth within the housing, in some instances there being flow passages at various depths. A low friction coupling in the valve stem enables the stem to be threaded during operation without transmitting rotation to the valve plunger.

---

This application is a continuation-in-part of copending application Ser. No. 426,171 filed Jan. 18, 1965, and now abandoned.

This invention relates to a valve construction and, more particularly, to a valve structure sub-assembly which is received in a receptacle on a valve housing.

In many hydraulic or pneumatic systems and the like involving the control of fluid flow, it is particularly desirable to provide in a single housing a complete flow system, perhaps including several valves, regulators and the like. In such instance, it is highly desirable to provide separate, easily handled valve units or sub-assemblies to be mounted on the larger valve housing.

It is the principal object of this invention to provide valve sub-assemblies for such flow systems.

In carrying out this invention, I provide a valve housing in which is formed at least one main valve accommodating bore and laterally extending fluid passageways which intersect the main bore at axially spaced locations. Then, adapted to be accommodated within the main bore is a valve sub-assembly having a cylindrical extension carrying a pair of seal rings around the outside thereof. One seal is located intermediate the two flow passages to prevent leakage between them when the valve is closed, and the other is located above the outermost is closed, and the other is located above the outermost flow passage to prevent leakage to the outside. Axially spaced inlet and outlet flow ports are provided in the extension to communicate with the flow passages when the extension is in place within the bore. Intermediate the flow ports I provide an annular valve seat which, in turn, is engaged by an annular working surface of a valve closure member which is reciprocable within the sub-assembly. At the upper portion of the sub-assembly I provide a valve operator housing which accommodates the means for moving the valve closure member toward and away from the valve seat. In one form of this invention, this valve-operating mechanism comprises a screw feed that moves the valve closure member lineally.

Other objects and advantages of this invention will become apparent from the description following when read in conjunction with accompanying drawings, wherein:

FIG. 1 is a section view of one form of valve embodying features of this invention;

FIG. 2 is a partial section view of the main seal ring of the valve of FIG. 1;

Figure 3:
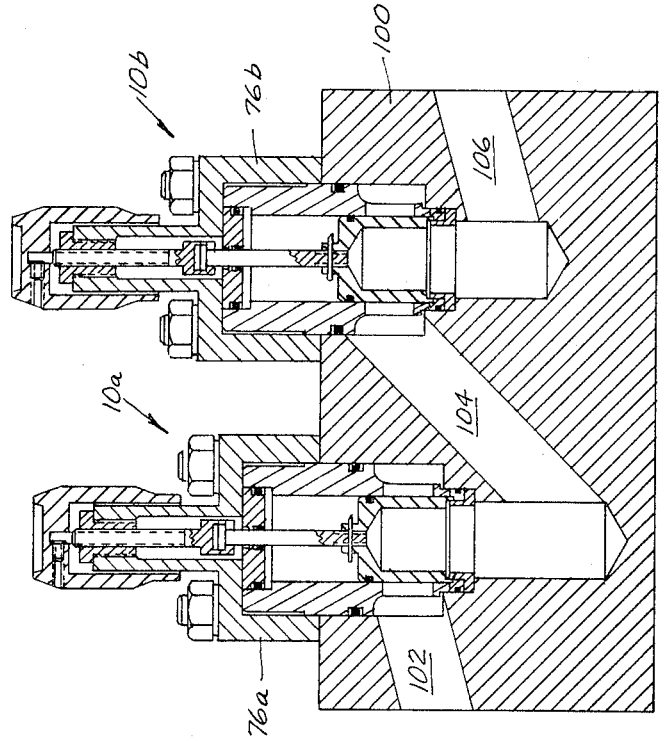
FIG. 3 is a section view of a manifold hydraulic system embodying features of this invention.

Referring now to FIG. 1, the valve sub-assembly 10 there shown is mounted on a large housing 12 of any suitable configuration, and such housing may include means, such as flanges 14 to connect it into a fluid conduit (not shown). Extending into the housing is a cylindrical valve-accommodating bore 16, and in the form of the invention shown in FIG. 1 the bore 16 is extended through a seat retaining counter-bore 17 and an outlet bore 18.

Extending into the housing 12 from opposite sides to intersect with the bore 16 and its extensions 18 are upstream and downstream flow pasages 20 and 22, respectively. It will be noted that these flow passages intersect the bore at axially spaced locations, with the seat receiving bore 17 being disposed between them.

The valve sub-assembly 10 comprises a valve operating unit 24 and a cylindrical extension or sub-housing 26 that extends into the bore 16. The sub-housing 26 is of reduced diameter at its lower end 27 to form an annular duct 30 around it, which communicates with a series of inlet ports 32 around the sub-housing 26. An annular valve seat-retaining ring 34 including a radial flange 36 is carried in the seat-receving counter-bore 17 to position the annular valve seat 38 (FIG. 2). The valve seat 38 is preferably of a slightly resilient material such as nylon or the like to effect a fluid-tight seal, and a suitable seal ring such as an O-ring 42 around the seat ring 38 engages the wall of bore 17 to provide a seal around the valve seat 38 between the inlet and outlet flow passages 20 and 22. Another O-ring 46 carried in the recess 48 around the sub-housing 26 above the upstream flow passage 20 prevents leakage to the outside.

Slidably carried within the sub-housing 26 is a piston-like valve closure member 50, the lower end of which 52 is of reduced thickness to form the working surface that engages the resilient valve seat seal 38. With the working surface 52 of the valve piston 50 firmly engaging the seal ring 38 and the O-ring 42 sealing between the seal ring 38 and the wall of the bore 17, the inlet and outlet flow passages are in sealed isolation. A suitable seal, such as the O-ring 54 is provided to seal off the piston valve closure 50 against leakage and a pressure equalizing port 56 is provided in the top of the piston to prevent entrapment of fluids above it.

The valve closure member 50 is operated by means of a stem 58 which may be secured to the closure member as by threading it into a tapped boss 60 at the top of the piston 50 and preferably pinning it at 62 against inadvertent removal. The stem 58 extends through an opening 64 in the top cover 66 of the sub-housing which is made fluid-tight by use of suitable sealing means such as the O-ring 68 around the cover and the O-ring 70 around the stem. A retainer disc 72 prevents dislodgment of the O-rings 68 and 70.

It will be noted from the above description that the valve sub-assembly extension is made up of a number of small elements, each of which is conveniently handled and machined, and these elements are assembled easily to provide a very effective valve unit. For example, the sub-housing 26 is simply a sleeve that is counterbored at one end to accommodate the closure cover 66 and turned down at the other end 27 to provide the annular duct 30 and the O-ring recess 48. The top cover 66 is, in turn, bored and counterbored to accommodate the stem 58 and the O-ring 70, respectively. Each of these elements is small and very easily handled.

Connected to the sub-housing 26 to complete the valve sub-assembly is the operator body 74 including a cylindrical portion 76 large enough to accommodate the sub-housing 26 and an upper tubular extension 78. Secured at the upper end of the tubular extension is an internally threaded actuator nut 80 that receives a complementary threaded screw 82, to the upper end of which is keyed a manually rotated operating handle 84. At the lower end of the screw 82 I provide a coupling member 86 which receives an enlarged head 88 on the stem 58. The coupling 86 is rotatable about the head 88 and such rotation is facilitated by low-friction contact with a disc 90 of nylon or the like. Further, the upper surface 92 of the head 88 is preferably formed of spherical or conical configuration to provide point contact with the nylon disc 90. As a result, when the piston work surface 52 engages the seat ring 38, the friction torque between them prevents rotary movement of the piston and any rotation occurs within the coupling 86, thus avoiding damage to the seat ring 38.

The coupling 86 and the valve stem 58 hold the sub-assembly 10 together until it is positioned on the valve body 12. Then the studs 94 secure it to the valve body against fluid pressure in the system.

Because the valve stem 58 is readily removable from the piston closure 50 and the stem and operator 80, 82 are easily separated at the coupling 86, it is apparent that various combinations of sub-housings and operator bodies 74 may be employed.

Referring now to FIG. 3, a plurality of valve bodies 10a and 10b may be mounted on a single manifold valve housing 100 having fluid passages 102, 104 and 106 at varying depths. Location of the valve closure members 50, the valve seats 34 and complementary components is determined simply by regulating the height of the operator housings 76a and 76b. Thus, as shown, housing 76a is shorter than housing 76b and, as a consequence, the components of valve 10a penetrate further into the manifold valve housing 100 to control a flow passage 102 at a lower level than that 104 controlled by the valve 10b.

Figure 4:
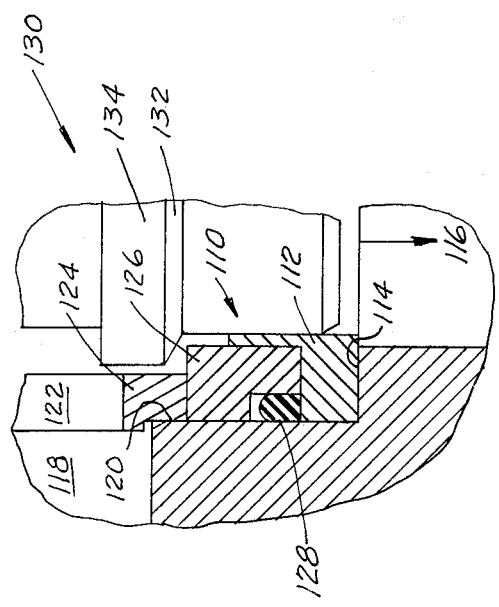
FIG. 4 is an enlarged partial section view of another embodiment of the main seal ring.

In FIG. 4 I have illustrated another form of valve seat 110 wherein the seal ring retainer 112 is seated on a shoulder 114 forming the outlet passage 116. The inlet passage 118 opens into the housing bore 120 and the sub-housing passage 122, the sub-housing 124 holding down the seal ring 126. The seal ring 126 may be of suitable plastic and is preferably sealed around its outer diameter as by means of an O-ring 128. The seal ring is of a sufficient axial thickness that it extends above the retainer ring 112 and the valve plunger 130 seals off the inlet passage 118 by engagement of a frusto-conical under surface 132 on an integral collar 134. The frusto-conical surface provides line contact insuring a complete seal, despite irregularities, and in addition it transmits a radial component of force against the seal ring which tends to force it into its recess behind the seal retainer. This greatly reduces the possibility of extruding the seal ring into the outlet flow passage 116.

The invention having been described in connection with preferred embodiments thereof, it will be apparent that changes and modifications thereto may be made by those skilled in the art without departing from the spirit and scope of the invention.

Having described my invention, I claim:

1. A fluid control device comprising:
  a housing,
  means forming at least two receptacles opening into a wall of said housing,
  inlet and outlet flow passages opening into axially spaced portions of each said receptacle,
  said inlet flow passages being displaced different predetermined distances from said housing wall,
  a cylindrical inner surface in each said receptacle intermediate said flow passages,
  a valve sub-assembly for each said receptacle,
  a tubular cylindrical extension on each said sub-assembly received in one of said receptacles and fitting snugly within said receptacle cylindrical inner surface,
  an annular resilient valve seat in each said receptacle,
  means supporting said valve seat coaxially with said cylindrical inner surface and intermediate said flow passages,
  at least one upstream flow port in each said extension,
  a cover member enclosing and securing each said tubular extension within its said receptacle,
  means on each said cover member fixing the amount of displacement thereof from said housing wall to position said upstream flow port in axial alignment with the corresponding inlet flow passage,
  a valve plunger closure member slidable axially within each said extension to bring a complementary annular working surface thereon into and out of sealing engagement with said seat ring,
  a sliding valve stem extending through each said tubular extension and connected to said valve closure member,
  portions on each said cover member supporting an internally threaded member,
  a threaded valve stem extending through said internally threaded member,
  releasable means connecting said sliding valve stem and said threaded valve stem end to end, and
  low friction means in the connection between said valve stems enabling relative rotation thereof.

2. The fluid flow control device defined by claim 1 including:
  a circular disc within said cylindrical extension adjacent said cover member,
  means sealing between said extension and said disc,
  a bore through said disc slidably accommodating said sliding valve stem, and
  means sealing between said disc and said stem.

3. The fluid flow control device defined by claim 1 wherein said releasable connecting means comprises:
  a receptacle on one of said valve stems receiving the end of the other of said valve stems, and
  interengageable portions on said valve stems preventing axial separation thereof.

4. The fluid flow control device defined by claim 1 wherein said low friction means comprises:
  a disc having low-friction surfaces interposed between said valve stems,
  the end of at least one of said valve stems having a conical surface to provide minimal area of engagement with said low friction disc.

5. The fluid flow control device defined by claim 1 including:
  a circular disc within said cylindrical extension adjacent said cover member,
  means forming a peripheral recess in said disc,
  a resilient seal in said recess sealing against said cylindrical extension,
  a first bore through said disc slidably accommodating said sliding valve stem,
  a counter bore coaxial with said first bore,
  a reselient seal ring around said sliding stem received in said counter bore, and
  retaining means with a central bore therein receiving said valve stem and restricting axial movement of said seal ring.

6. The combination defined by claim 5 wherein:
  said peripheral recess extends into the inner circular face of said disc to leave a radial flange at the outer face thereof, and
  said retaining means comprises a second circular disc substantially of the diameter of said radial flange to retain the outer seal in said circumferential recess.

7. A valve construction comprising:
  a housing,
  means forming a receptacle opening into a wall of said housing,
  inlet and outlet flow passages opening into axially spaced portions of said receptacle, said inlet flow passage being displaced a predetermined distance from said housing wall, an internal shoulder in said receptacle intermediate said flow passages, a resilient seat ring supported on said shoulder, a sleeve-like seat ring retainer on said shoulder coaxially with and within said seat ring to restrain inward radial distortion of said seat ring, and a valve plunger movable axially within said receptacle extension to bring an annular working surface thereon into and out of sealing engagement with said seat ring, said seat ring being configured to extend axially beyond said retainer and being of an internal diameter less than the external diameter of said annular valve plunger working surface so that a portion of said seat ring is exposed to engagement by said annular working surface, said annular working surface on the valve plunger being of frusto-conical configuration to make sealing contact with said exposed portion of the seat ring and to assert a radially outward force component thereagainst, said annular working surface merging into a throttling cylindrical extension on said valve plunger to be slidably received in said seat ring retainer.

References Cited

UNITED STATES PATENTS

| | | | |
|---|---|---|---|
| 654,810 | 7/1900 | Shultz | 251—118 XR |
| 2,644,662 | 7/1953 | Powers | 251—362 XR |
| 2,895,495 | 7/1959 | Bryant | 251—367 XR |
| 2,934,090 | 4/1960 | Kennan et al. | 251—362 XR |
| 3,206,165 | 9/1965 | Salmon et al. | 251—367 XR |
| 3,298,389 | 1/1967 | Freeman | 137—454.6 |
| 3,335,999 | 8/1967 | Lowrey | 251—362 XR |
| 3,348,570 | 10/1967 | Nealy | 137—454.6 XR |

FOREIGN PATENTS

| | | |
|---|---|---|
| 303,770 | 1/1929 | Great Britain. |

SAMUEL SCOTT, Primary Examiner

U.S. Cl. X.R.

251—362